US008677108B2

(12) United States Patent
Nicolson et al.

(10) Patent No.: US 8,677,108 B2
(45) Date of Patent: Mar. 18, 2014

(54) METHOD FOR FINDING NEXT COMPONENT TO BE BOOTED BASED ON BOOTING STATUS OF CURRENT COMPONENT TO CONTINUE BOOTING PROCESS BY USING A COMPONENT LOOK-UP TABLE

(75) Inventors: Kenneth Alexander Nicolson, Hyogo (JP); Hideki Matsushima, Osaka (JP); Hisashi Takayama, Osaka (JP); Takayuki Ito, Osaka (JP); Tomoyuki Haga, Nara (JP)

(73) Assignee: Panasonic Corporation, Osaka (JP)

( * ) Notice: Subject to any disclaimer, the term of this patent is extended or adjusted under 35 U.S.C. 154(b) by 604 days.

(21) Appl. No.: 12/864,589

(22) PCT Filed: Jan. 29, 2009

(86) PCT No.: PCT/JP2009/000340
§ 371 (c)(1),
(2), (4) Date: Jul. 26, 2010

(87) PCT Pub. No.: WO2009/096181
PCT Pub. Date: Aug. 6, 2009

(65) Prior Publication Data
US 2010/0318781 A1    Dec. 16, 2010

(30) Foreign Application Priority Data

Jan. 30, 2008    (JP) .................................. 2008-019379

(51) Int. Cl.
*G06F 9/00*    (2006.01)
*G06F 9/24*    (2006.01)
*G06F 15/177*    (2006.01)

(52) U.S. Cl.
USPC ................................................ 713/1; 713/2

(58) Field of Classification Search
USPC ........................................... 713/1, 2; 714/36
See application file for complete search history.

(56) References Cited

U.S. PATENT DOCUMENTS

| 5,974,546 | A  | * | 10/1999 | Anderson .................... 713/2 |
| 6,263,431 | B1 |   | 7/2001  | Lovelace et al. |
| 6,463,550 | B1 | * | 10/2002 | Cepulis et al. ................. 714/25 |
| 6,757,824 | B1 |   | 6/2004  | England |
| 6,978,365 | B2 |   | 12/2005 | England |
| 7,017,034 | B2 |   | 3/2006  | Qureshi et al. |

(Continued)

FOREIGN PATENT DOCUMENTS

| JP | 2004-504648 | 2/2004 |
| JP | 2004-70952  | 3/2004 |

(Continued)

OTHER PUBLICATIONS

International Search Report issued Sep. 11, 2009 in International (PCT) Application No. PCT/JP2009/000340.

(Continued)

*Primary Examiner* — Thomas Lee
*Assistant Examiner* — Xuxing Chen
(74) *Attorney, Agent, or Firm* — Wenderoth, Lind & Ponack, L.L.P.

(57) ABSTRACT

A method to allow a device to boot in a secure fashion, even though some of the components within the secure device's firmware may not be present, not correctly authorized, or not correctly operating.

8 Claims, 12 Drawing Sheets

(56) References Cited

U.S. PATENT DOCUMENTS

| | | |
|---|---|---|
| 7,409,537 B2 | 8/2008 | Tsang |
| 7,512,786 B2 | 3/2009 | England |
| 7,840,846 B2 * | 11/2010 | Landers et al. ............ 714/36 |
| 8,239,688 B2 * | 8/2012 | De Atley et al. ........... 713/189 |
| 2004/0003288 A1 | 1/2004 | Wiseman et al. |
| 2004/0030875 A1 | 2/2004 | Qureshi et al. |
| 2004/0193873 A1 | 9/2004 | England |
| 2005/0097328 A1 | 5/2005 | England |
| 2005/0138414 A1 | 6/2005 | Zimmer et al. |
| 2006/0059331 A1 | 3/2006 | Zilavy et al. |
| 2007/0067617 A1 | 3/2007 | Tarkkala |
| 2007/0083743 A1 | 4/2007 | Tsang |
| 2007/0226518 A1 | 9/2007 | Yasaki et al. |

FOREIGN PATENT DOCUMENTS

| | | |
|---|---|---|
| JP | 2004-280284 | 10/2004 |
| JP | 2006-85702 | 3/2006 |
| WO | 01/42889 | 6/2001 |
| WO | 2007/031834 | 3/2007 |
| WO | 2007/044516 | 4/2007 |
| WO | 2008/007111 | 1/2008 |

OTHER PUBLICATIONS

*TCG Mobile Reference Architecture*, Specification Version 1.0, Revision 1, Jun. 12, 2007.

*TCG Mobile Trusted Module Specification*, Specification Version 1.0, Revision 1, Jun. 12, 2007.

* cited by examiner

FIG. 5b

| Logical certificate ID | Dependent trusted component status | Dependent trusted component mask | RIM Certificate label |
|---|---|---|---|
| Trusted Component 2 Verify | Trusted Component 1 OK | Trusted Component 1 | cmp1_v01 |
| Trusted Component 2 Verify | Trusted Component 1 FAILED | Trusted Component 1 | cmp1_v02 |
| Trusted Component 3 Verify | Trusted Component 1 OK, Trusted Component 2 OK | Trusted Component 1, Trusted Component 2 | cmp2_v01 |
| Trusted Component 3 Verify | Trusted Component 1 FAILED, Trusted Component 2 OK | Trusted Component 1, Trusted Component 2 | cmp2_v02 |
| Trusted Component 3 Verify | Trusted Component 1 OK, Trusted Component 2 OK | Trusted Component 1, Trusted Component 2 | cmp2_v03 |

FIG. 5C

| Failed trusted component | Dependent trusted component status | Dependent trusted component mask | Trusted component to launch |
|---|---|---|---|
| Trusted Component 1 | None | None | Trusted Component 2 |
| Trusted Component 2 | Trusted Component 1 FAILED | Trusted Component 1 | Abort Boot |
| Trusted Component 3 | Trusted Component 1 OK | Trusted Component 1 | Trusted Component 3 |
| Operating System | None | None | Operating System |
| | | | Abort Boot |

METHOD FOR FINDING NEXT COMPONENT TO BE BOOTED BASED ON BOOTING STATUS OF CURRENT COMPONENT TO CONTINUE BOOTING PROCESS BY USING A COMPONENT LOOK-UP TABLE

TECHNICAL FIELD

The present invention relates to a system for supporting optional or failing components within a system that will perform a secure boot.

BACKGROUND ART

Initiatives such as the Trusted Computing Group's (TCG) Mobile Trusted Module (MTM) documents TCG Mobile Reference Architecture version 1.0 12 Jun. 2007 (Non Patent Citation 1) and TCG Mobile Trusted Module Specification version 1.0 12 Jun. 2007 (Non Patent Citation 2) describe how to start-up a device in an assured and trusted fashion. These methods have been thoroughly reviewed to ensure that trust and security is maintained throughout the boot process, so provide a useful baseline for those wanting to implement a device that can boot securely. A key component of this secure boot process is a RIM Certificate. This is a signed structure that defines what the current expected platform state should be, represented by a hash of a set of Platform Configuration Registers (PCRs), which themselves contain known, publically defined hash values. These PCRs act as integrity measurements that may be recorded in RIM Certificates to define an expected machine state. In addition, the RIM Certificate also specifies a PCR to be extended if the current state is verified. This extend process takes a specified PCR and calculates a new hash value based on the previous PCR value concatenated with a new known value defined within the RIM Certificate. A typical secure boot sequence as defined by the TCG starts with the initialization and self-verification of the core components such as the roots of trust for verification and for measurement (the RTV+RTM), the MTM itself and associated core MTM interface components. Next, additional components that support other parts of the firmware are started in a trusted fashion, for example, each of them is verified on their starting by another component having been booted before them. And finally the operating system runs to provide a secure and trusted path for client applications to access MTM services.
Patent Citation 1: US Patent Application No. 2005/0138414
Non Patent Citation 1: TCG Mobile Reference Architecture version 1.0 12 Jun. 2007
Non Patent Citation 2: TCG Mobile Trusted Module Specification version 1.0 12 Jun. 2007

SUMMARY OF THE INVENTION

Technical Problem

However, the specifications are rigid, providing only a single control path through the boot process that results either in complete success or complete failure. In other words, if boot process of one component is failed, all of the other components cannot be used even if their own boot processes resulted in success.

Furthermore, the TCG specifications provide facilities for auditing, recognising that portable devices such as mobile phones have limited resources. Although they define these auditing features are optional with an MTM, but this makes problems shown below. As described above, although this feature is merely an option, a failure in the boot process of this feature makes all components of the mobile phone unable to be used. Furthermore, although this feature is not needed to be implemented (because it is an option), the verification becomes always failed without implementing this feature. This makes it harder for other processes to detect why or where there was a failure in the boot process. Furthermore, a device manufacturer may wish to offer certain trusted components as options.

Additionally, in many markets there are legal requirements upon service providers to allow users to make emergency calls even from mobile phones that do not have a current service contract or are outside of areas where they have a current service contract. On a phone equipped with an MTM, revocation of certificates or corruption of non-critical components results in a phone that may fail to operate at all, so cannot meet this legal requirement.

In US Patent Application No. 2005/0138414 by Zimmer et al (Patent Citation 1) a verified boot method with optional components is disclosed, but the optional components are implemented according to explicit switches; there is no consideration for how to handle an error occurring when handling an optional component such as component program file corruption or hardware initialization failure.

What is needed, therefore, is a method that will support optional components within the context of a secure boot as defined by the TCG Mobile Phone Working Group, and will still operate in a reduced functionality manner even though some RIM Certificates (RIM Certs) are revoked or components are not functioning, and that will allow an easier, less resource-heavy method of determining the state of a MTM after secure boot finishes.

While the background art describe ways to boot according to a single defined sequence, it does not suggest what to do if one non-critical component fails or is not present. Furthermore, a failure state is only recorded for the whole secure boot process, not the individual components. As a result, for each role where a RIM Certificate is needed, there is only a single one available.

Technical Solution

Therefore, there is an unmet need for, and it would be highly useful to have, a system and method that allows multiple execution sequences for secure boot to be defined, while still maintaining the security and trust of the device being booted, to enable support on the device for optional and failed components.

Furthermore, there is an unmet need for, and it would be highly useful to have, a system and method that in addition to the above, records the success or failure of each individual component within the secure boot system, to enable the user to determine the state of the secure environment after a secure boot completes.

Furthermore, there is an unmet need for, and it would be highly useful to have, a system and method that in addition to the above, allows the use of multiple RIM Certificates for each role, to enable optional components to be supported while still maintaining the security and trust of the device.

According to a preferred embodiment of the present invention, the success or failure of each individual component is recorded within a table accessible by all other trusted components.

According to another preferred embodiment of the present invention, multiple execution sequences are described in a table that describes an alternative component to execute after a given component fails. This table is indexed by means of a combination of an identifier for the failed module and the state of the previously executed or failed components.

According to another preferred embodiment of the present invention, in order that each individual component can be correctly verified according to the state of the previously executed or failed components, each component has multiple RIM Certificates that describe the various valid preconditions that must be true before the component can run.

Advantageous Effects

According to the present invention, in boot processes that ensure trust and security, even when the boot process of one component fails, it is possible to execute a boot process that handles the failure.

The disclosure of Japanese Patent Application No. 2008-019379 filed on Jan. 30, 2008 including specification, drawings and claims is incorporated herein by reference in its entirety.

BRIEF DESCRIPTION OF THE DRAWINGS

A better understanding of the present invention can be obtained when the following detailed description of a preferred embodiment is considered in conjunction with the following drawings, in which:

FIG. 5b illustrates the Map ID to cert table that is attached to a RIM Certificate.

FIG. 5c illustrates the Next component table that is attached to a RIM Certificate.

EXPLANATION OF REFERENCE

Figure 1:
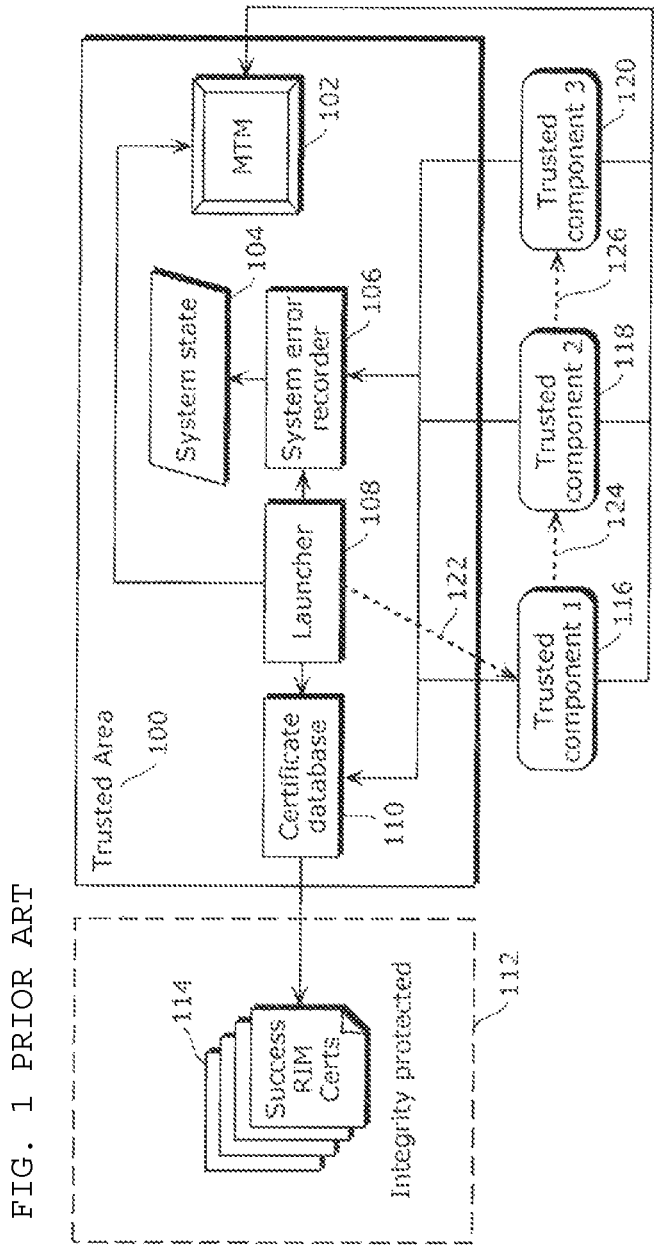
FIG. 1 illustrates a block diagram representing the prior art.

102 MTM
104 System state
106 System error recorder
108 Launcher
110 Certificate database
112 Integrity protected
114 Success RIM cert
116 Trusted component 1
118 Trusted component 2
120 Trusted component 3
122, 124, 126 Normal execution path
200 Trusted component 4
202 Trusted component 5
204 Operating System
300 Component error states
302 Component error recorder
304 Certificate look-up
306 Map ID to cert table
308 Fail RIM cert
312 Next component table
324 Fail sequencer
326, 328 Error execution path Detailed Description of the Invention Embodiment The present invention relates to a system for supporting optional or failing components within a system that will perform a secure boot. By providing the described additional RIM Certificates and data tables, a developer of a device that supports secure boot is able to produce a system that has flexibility to deal with components that fail to start, and a device that is able to report the state of the components within the trusted environment that results from the secure boot.

A new method for dealing with optional components on a device that supports secure boot is described. In the following description, for purposes of explanation numerous specific details are set forth in order to provide a thorough understanding of the present invention. In other instances, well-known structures and devices are shown in block diagram form without explaining their specific details to facilitate explanation. It will be evident, however, to one of ordinary skill in the art that the present invention may be practiced by modifying or without these specific details. The description of preferred embodiments is not intended to limit the scope of the claims appended hereto.

FIG. 1 illustrates the prior art. This figure captures the state of the secure boot process at a moment in time after the core elements such as the RTV+RTM and the MTM interface within Trusted Area 100 have self-verified. The MTM 102 is the core of this Trusted Area 100, but other key items within this are the System state 104 flag that indicates whether or not the secure boot has progressed correctly; the System error recorder 106 that sets the System state 104; the Launcher 108 that is responsible for launching the next component that is to be added to the Trusted Area 100; and the Certificate database 110 that looks up the required Success RIM Cert 114. These Success RIM Certs 114 describe the expected platform states during a fully successful secure boot. RIM Certs should be protected from altering in order to check whether the secure boot results in success or not correctly, so, they are integrity protected, and are placed in the set of Integrity protected 112 data items. As defined by the TCG, this integrity protection is achieved by having a signed hash embedded within the RIM Cert, thus allowing the MTM 102 to detect tampering.

The purpose of the secure boot is to expand the Trusted Area 100 to encompass additional components such as Trusted component 1 116, Trusted component 2 118, and Trusted component 3 120. The dotted line from Launcher 108 through Trusted component 1 116, Trusted component 2 118, and Trusted component 3 120 labelled 122, 124 and 126 indicates the normal execution path according to one aspect of the prior art. According to another aspect of the prior art, further trusted components may be present, with the operating system (not shown) as the final trusted component. A particular sequence for launching trusted components is defined by the design of the secure boot system.

Figure 2:
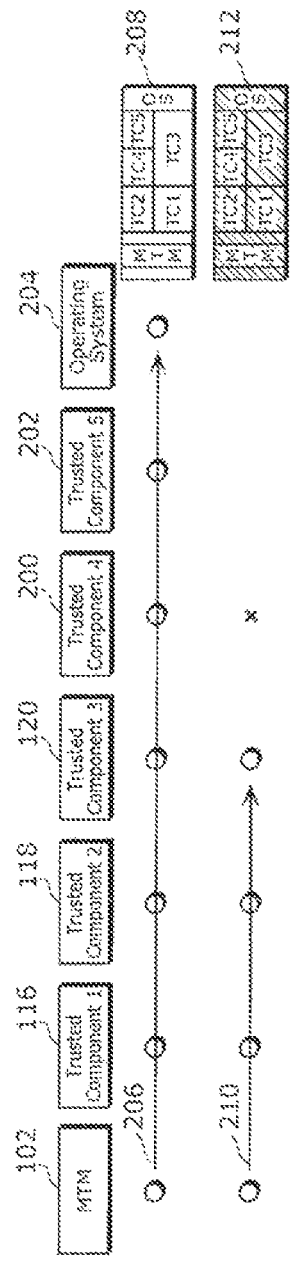
FIG. 2 illustrates the prior art sequencing of a secure boot.

FIG. 2 illustrates the outcomes of the prior art secure boot process according to the method described in FIG. 1. Here, the standard boot sequence starts from the MTM 102, then Trusted component 1 116 runs, passes control to Trusted component 2 118, and so on through Trusted component 3 120, Trusted component 4 200, Trusted component 5 202 then finally the Operating System 204. Trusted component 2 118, Trusted component 4 200 and Trusted component 5 202 are components that provide further optional services on top of basic services provided by Trusted component 1 116 and Trusted component 3 120. In a successful case, as noted in the flow 206, all components run successfully and a fully-operating trusted area 208 is available. However, in flow 210 Trusted component 4 200 fails to load, so the whole of the trusted area 212 is unavailable due to being in a failed state. In the trusted area diagrams 208 and 212, MTM represents the MTM 102, TC1 represents Trusted component 1 116, TC2 represents Trusted component 2 118, TC3 -represents Trusted component 3 120, TC4 represents Trusted component 4 200, TC5 represents Trusted component 5 202, and OS represents Operating System 204. All components depend on the MTM 102, and in addition Trusted component 2 118 depends on Trusted component 1 116, and Trusted component 4 200 and Trusted component 5 202 depend on Trusted component 3 120. The Operating System 204 depends on Trusted component 1 116 and Trusted component 3 120. Shaded parts shows the components which can not used.

Figure 3:
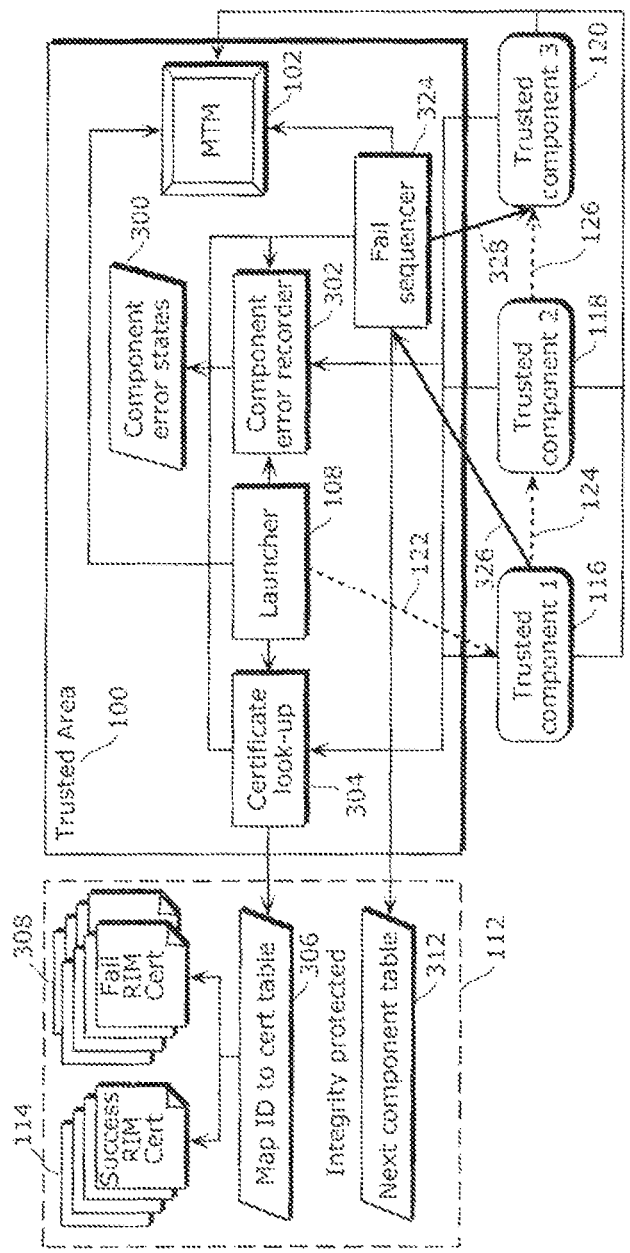
FIG. 3 illustrates a block diagram representing secure boot with optional components.

FIG. 3 illustrates the present invention, based on the prior art described in FIG. 1. This figure captures the state of the secure boot process at a moment in time after the core elements such as the RTV+RTM and the MTM interface within the Trusted Area 100 have self-verified. The MTM 102 is the core of this Trusted Area 100, but other key items within this are the Component error states 300 flags that indicate whether or not each of the components in the secure boot have started up and are operating correctly; the Component error recorder 302 sets the Component error states 300 for the appropriate components; the Launcher 108 that is responsible for launching the next component that is to be added to the Trusted Area 100; the Certificate look-up 304 that looks up the required Success RIM Cert 114 or Fail RIM Cert 308 according to the Map ID to cert table 306 and the Component error states 300; these Fail RIM Certs 308 describe the expected platform states during a secure boot where one or more components have failed to operate correctly. The Fail sequencer 324 that uses the Next component table 312 and the Component error states 300 to choose which component to launch next is described in detail in FIG. 9. These RIM Certificates 114 and 308, the Next component table 312, and the Map ID to cert table 306 should be integrity protected, so are placed in the set of Integrity protected 112 data items. Note that as with FIG. 1, integrity protection is an intrinsic property of the data rather than being an extrinsic property. Also note that the formats of Success RIM Certs 114 and Fail RIM Certs 308 are identical; the key difference is the roles they are assigned according to the Map ID to cert table 306; other than based on that table, it is impossible to distinguish between the two, and indeed there is no need to make that distinction elsewhere.

The purpose of the secure boot with optional components is to expand the Trusted Area 100 to encompass if possible all additional components Trusted component 1 116, Trusted component 2 118 and Trusted component 3 120, but if any components fail to start up, the Trusted Area 100 will not expand to cover them. The dotted line from Launcher 108 through Trusted component 1 116, Trusted component 2 118, and Trusted component 3 120 labelled 122, 124 and 126 indicates the normal execution path according to one aspect of the prior art. According to another aspect of the prior art, further trusted components may be present, with the operating system (not shown) as the final trusted component. The heavier line from Trusted component 1 116, Fail sequencer 324, and Trusted component 3 120 labelled 326 and 328 indicates that according to one aspect of the present invention, if Trusted component 2 118 fails to start up, an alternative execution path is available.

Figure 4:
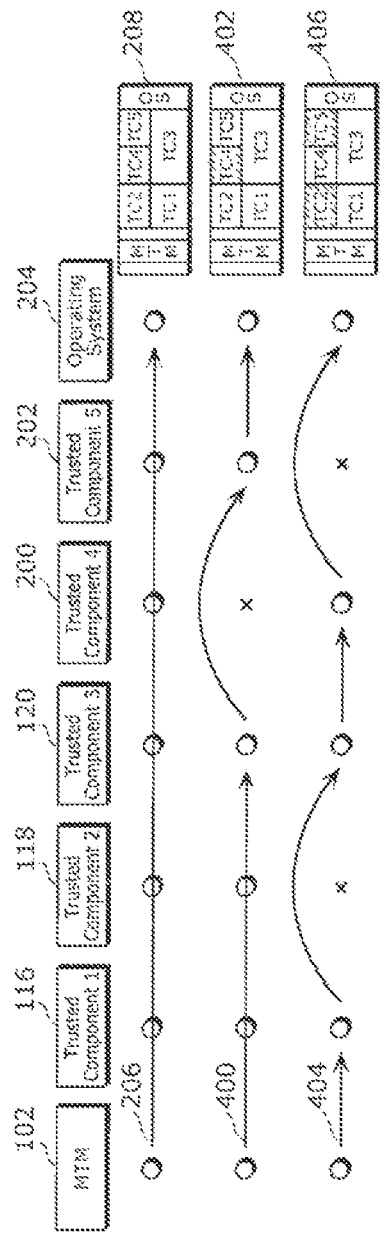
FIG. 4 illustrates the additional sequencing of a secure boot with error detection and optional components.

FIG. 4 illustrates the new outcomes that result from the present invention. The components available are as described in FIG. 2, and the successful outcome 208 is of course one valid outcome. However, in place of the failure condition 212, the new flow 400 is able to skip over the failing Trusted component 4 200 and continue on with Trusted component 5 202 to produce a functioning trusted area 402, but with limited capabilities. Similarly, flow 404 illustrates the case where both Trusted component 2 118 and Trusted component 5 202 fail to operate correctly, producing another functioning trusted area 406, but also with limited capabilities. In the trusted area diagrams 208, 402 and 406, TC1 represents Trusted component 1 116, TC2 represents Trusted component 2 118, TC3 represents Trusted component 3 120, TC4 represents Trusted component 4 200, TC5 represents Trusted component 5 202, and OS represents Operating System 204. All components depend on the MTM 102, and in addition Trusted component 2 118 depends on Trusted component 1 116, and Trusted component 4 200 and Trusted component 5 202 depend on Trusted component 3 120. The Operating System 204 depends on Trusted component 1 116 and Trusted component 3 120. Shaded parts shows the components which can not used.

Figure 5A:
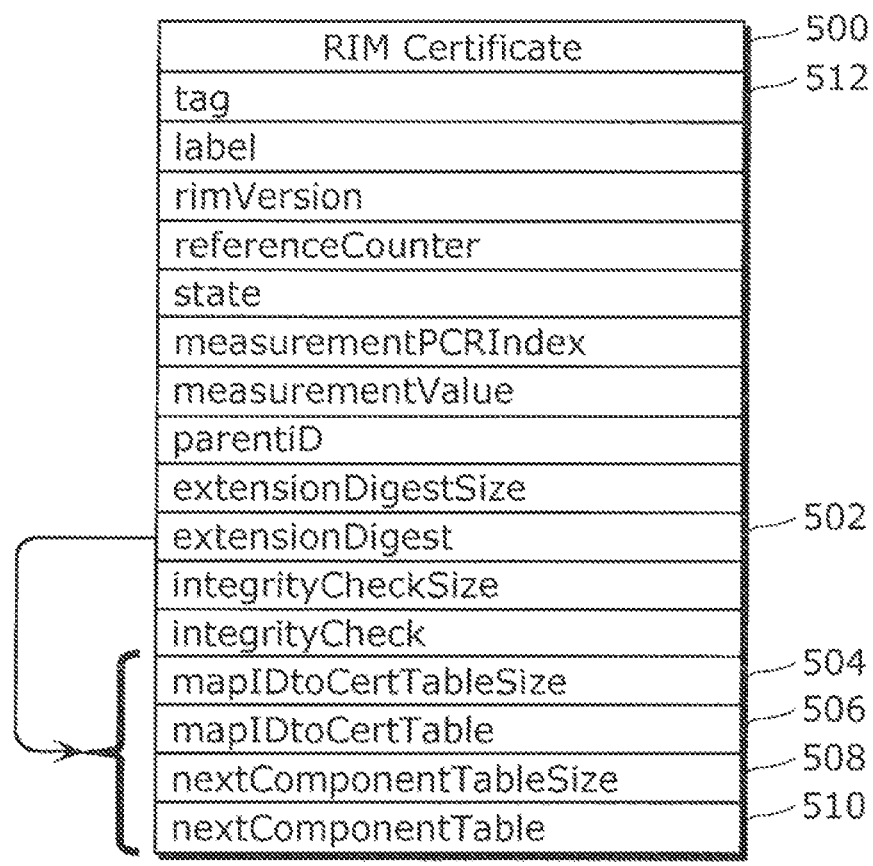
FIG. 5a illustrates a RIM Certificate containing additional data representing the tables needed to support optional components.
Figure 6:
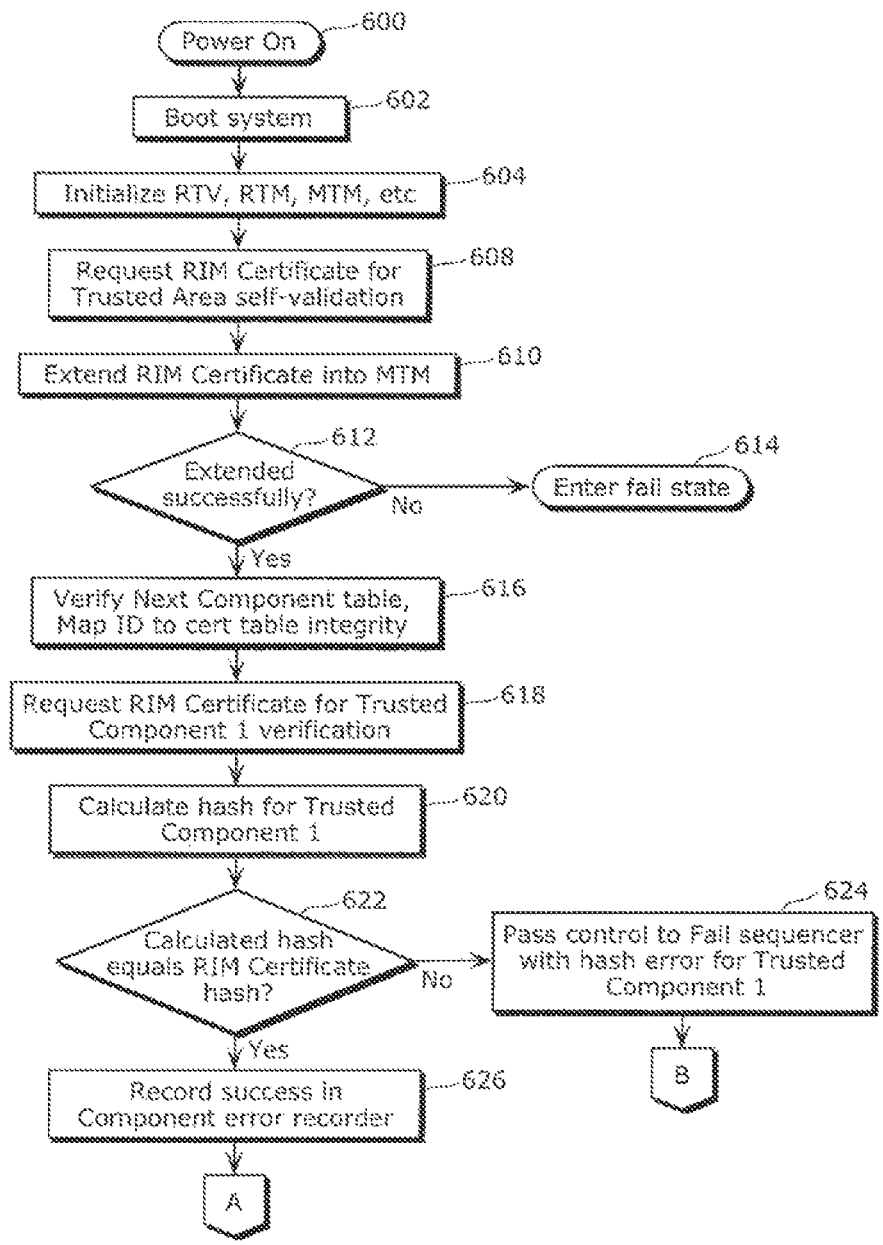
FIG. 6 illustrates a flow chart for the process of performing a secure boot with optional components according to the present invention.

FIG. 5a illustrates a RIM Certificate 500, a detail of Success RIM Cert 114 and Fail RIM Cert 308, an expansion of the RIM Certificate as defined by the prior art. To enable support for optional components, the mapIDtoCertTableSize 504, mapIDtoCertTable 506, nextComponentTableSize 508 and nextComponentTable 510 are appended to the certificate, and the extensionDigest 502 entry contains a cryptographic hash value for this extra data. Only one instance of this extended RIM certificate is required, and the one embodiment attaches these tables to the single RIM Certificate that the RTV+RTM uses to self-verify. This aspect of the prior art is not described here, however.

One ordinarily skilled in the art will see that there are other ways to make available and to maintain the integrity of mapIDtoCertTable 506 and nextComponentTable 510 without using a RIM Certificate 500, such as cryptographically signing each table individually or together by using a secret key known to both the signee and to the Trusted Area 100.

FIG. 5b illustrates the format of the Map ID to Cert table 506 with data entries that illustrate a mapping from logical identifiers and previous software components to actual RIM Certificates. The first column, Logical certificate ID 520 is an identifier that signifies a particular role for a RIM Certificate and is the identifier that other parts of the system use to request a RIM Certificate. The second column, Dependent trusted component status 522 is a set of flags indicating for what set of Trusted component error states each row is valid. The third column, Dependent trusted component mask 524 is a set of flags indicating which components are to have their statuses checked. In one embodiment, these two columns are implemented using bitmaps. Finally, the RIM Certificate label 526 column holds the actual RIM Certificate label that is to be used to look up the Success RIM Cert 114 or Fail RIM Cert 308 from the RIM Certificate database. This value represents a RIM Certificate label field 512 as defined by the TCG.

FIG. 5c illustrates the format of the Next component table 510 with sample data entries. The first column, Failed trusted component 540 is an identifier that signifies a component that has failed. The second column, Dependent trusted component status 542 is a set of flags indicating for what set of Trusted component error states 300 the current row is valid. The third column, Dependent trusted component mask 544 is a set of flags indicating which components are to have their statuses checked. In one embodiment, these two columns are implemented using bitmaps. Finally, the Trusted component to launch 546 column holds identifiers describing for a given Failed trusted component 540 and a set of Dependent trusted component statuses 542 which module should be launched next or whether the boot should be aborted because the secure boot has got into an unrecoverable state. Referring to FIG. 4, if the components Trusted Component 1 116 or Trusted Component 3 120 failed to load, there may be an entry indicating the next Trusted component to launch 546 is Abort Boot; this is because these two components are base components essential to the operation of the complete trusted system. If Trusted Component 2 118, Trusted Component 4 200 or Trusted Component 5 202 failed, there may be entries indicating, for example, that Trusted Component 3 120, Trusted Component 5 202 and Operating System 204 respectively is the next Trusted component to launch 546.

The contents of tables Map ID to Cert table 506 and Next component table 510 are defined by the design of the Secure Boot sequence required for a particular device. In the embodiment described above where the tables are attached to the RIM Certificate that the RTV+RTM uses to self-verify, the RIM Certificate issuing authority as defined by the TCG (most likely the device manufacturer) will generate these tables and add the data to the particular RIM Certificate, then sign the certificate and make it available for use on the device. However, these tables may be generated by another party and sent separately from the RIM Certificate. Furthermore, if the secure boot system can analyze its own Secure Boot sequence, the secure boot system may generate these tables by itself.

These tables are generated according to information showing which component is dependent on another component. If component A is dependent on another component B, the component A should not be booted if the boot procedure of component B fails. And if the component A is independent from the component B, the boot process can be resumed from the boot procedure of component A even if the component B could not boot successfully. Of course, these tables can be generated according to more information. For example, they can be generated according to information showing some components should not be booted if the boot procedure of another independent was failed. This information can be generated and provided by an author of each component.

FIG. 6 to FIG. 9 illustrates the control flow sequencing between the key parts of the secure boot system according to the present invention. First, in FIG. 6 according to the prior art, (600) the system starts on Power On, then (602) proceeds to perform the basic boot of the system, (604) initialize the RTV, RTM, MTM, etc, (608) request RIM Certificate for Trusted Area self-validation, and (610) extend that RIM Certificate into the MTM, by concatenating a subset of PCRs specified within the RIM Certificate and calculating the hash of them then comparing this hash value with a value stored within the RIM Certificate as described by the prior art. Then, if these hashes are equal, extend the value to extend specified within the RIM Certificate into the PCR also specified within the RIM Certificate. (612) The result of extend operation is checked to see if this extend worked correctly, and (614) on failure the system will enter a fail state. Now, according to the present invention, (616) the Next component table 312 and Map ID to cert table 306 have their integrity checked to ensure that these two key tables have not been tampered with; according to one embodiment, this is performed by checking the extended information as described in FIG. 5a is present in the RIM Certificate for self-validation retrieved at 608. One skilled in the art, however, will see that there are other ways of providing these tables and ensuring that this data has not been tampered with.

Next, (618) Request RIM Certificate for Trusted Component 1 verification obtains a RIM Certificate that describes the expected current state and the expected state of Trusted Component 1 116. (620) This Trusted Component has its hash value calculated in the same manner as described in the RIM Certificate in Calculate hash for Trusted Component 1, then (622) there is a check to see that the values are equal. If the hash values are not equal, they are indicating that there is a problem with the component such as accidental or deliberate corruption. Then, (624) the CPU will pass control to the Fail sequencer with an indicator to indicate that there was a hash error for Trusted Component 1, to allow the Fail sequencer to process the error. This processing is described in FIG. 9 below. If the hash values are equal, then (626) the Component error recorder records that the hash checking for this component was successful. The processing continues on FIG. 7.

Figure 7:
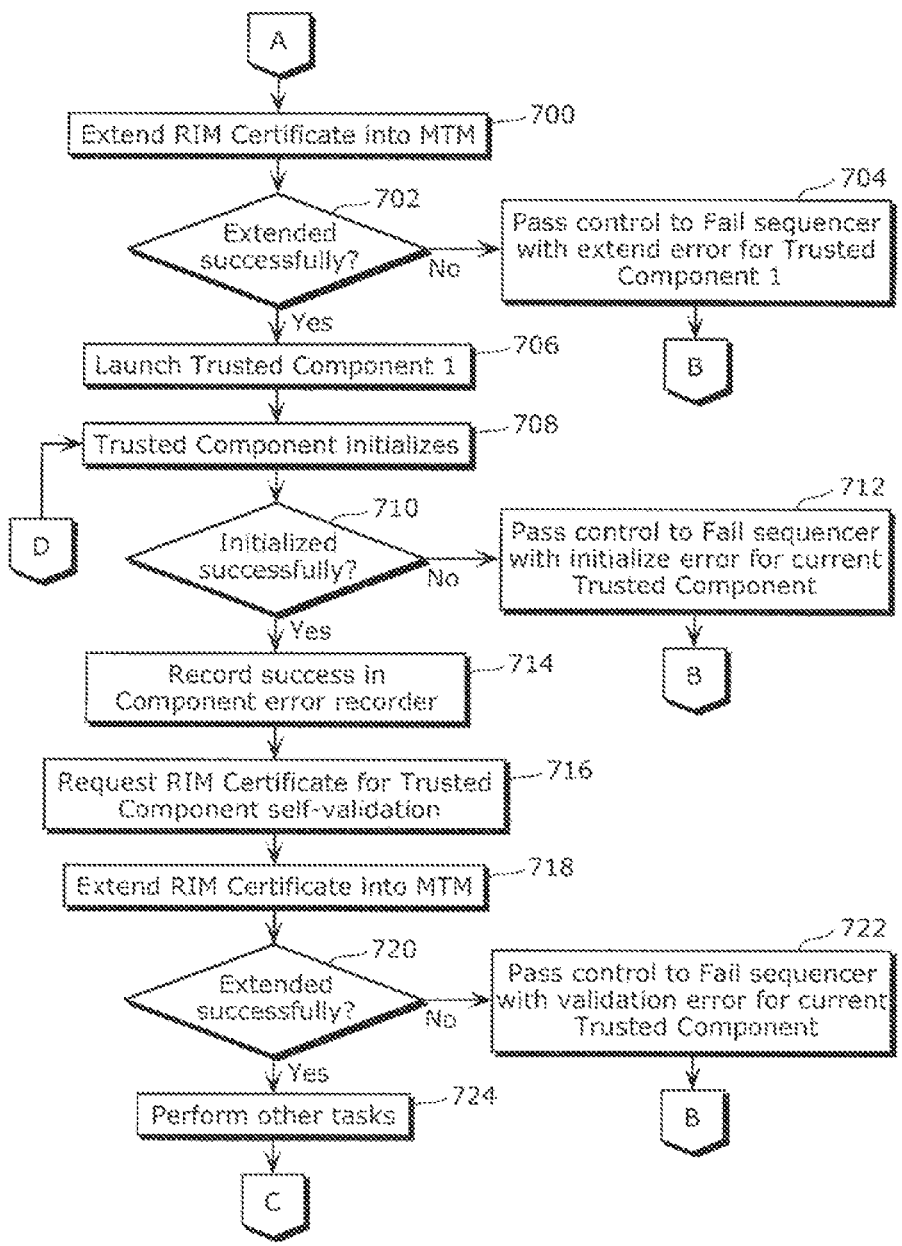
FIG. 7 illustrates a flow chart for the process of performing a secure boot with optional components according to the present invention.

FIG. 7 illustrates further handling of the secure boot sequence. (700) The previously-obtained RIM Certificate is extended into the MTM by appending a value defined in this RIM Certificate into a PCR defined in this RIM Certificate according to the prior art. (702) The result of extend operation is checked to see if this extend worked correctly. (704) If not, the CPU will pass control to the Fail sequencer, to allow the Fail sequencer to process the error. This processing is described in FIG. 9 below. If the hash value extended correctly, this indicates that the component can be fully trusted by the Trusted Area, so (706) the Trusted Component 1 is launched, and control is passed to this new component.

(708) The first processing is for the Trusted Component to initialize, which performs the required initialization for the component and any hardware, etc that this component may control. (710) The component self-checks that it has initialized successfully, and if there was an error, (712) the Trusted Component will pass control to the Fail sequencer with an error code to indicate that the current Trusted Component failed to initialize, to allow the Fail sequencer to process the error. This processing is described in FIG. 9 below. If there was no error, (714) the Component error recorder records that the initialization for this component was successful. (716) Next, the Trusted Component requests a RIM Certificate for self-validation, to obtain a RIM Certificate that describes the expected current state and a given value to extend into a given PCR. (718) This RIM Certificate is extended into the MTM according to the prior art, and (720) the success or otherwise of the extend operation is checked. If the extend operation failed, (722) the Trusted Component will pass control to the Fail sequencer with an error code to indicate that the current Trusted Component failed to self-validate, to allow the Fail sequencer to process the error. This processing is described in FIG. 9 below. If the value extended correctly, (724) the current Trusted Component can continue to perform other tasks as required. The processing continues on FIG. 8.

Figure 8:
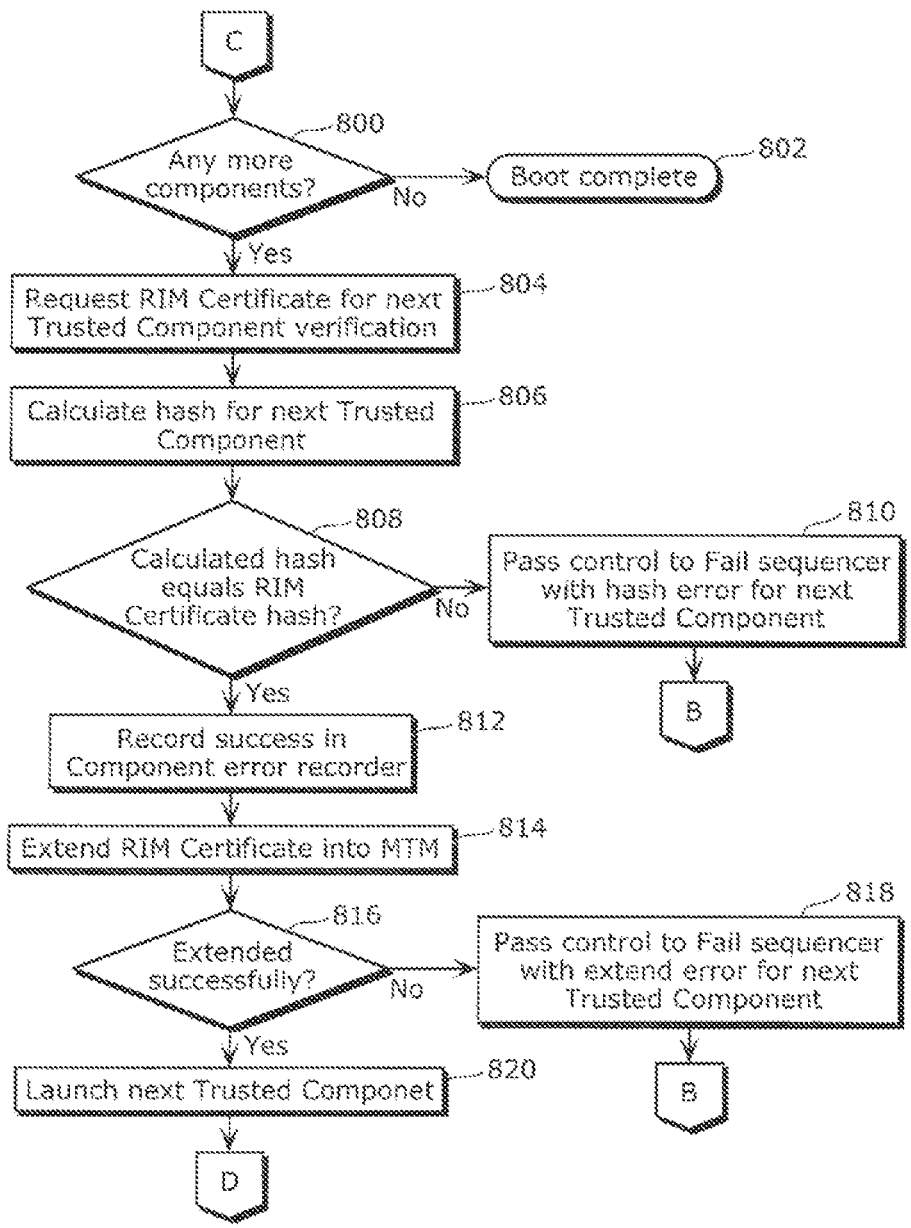
FIG. 8 illustrates a flow chart for the process of performing a secure boot with optional components according to the present invention.

FIG. 8 illustrates yet further handling of the secure boot sequence. (800) First, there is a check to see if there are any more Trusted Components to load, and if not, (802) the secure boot has been completed successfully. Note that in this embodiment, if verification of an optional component has been failed this optional component has not been booted. So, in the step 802, even if the secure boot has been completed successfully, some optional components may not be booted. In one embodiment this is not an actual check; the last component in the load sequence, in one embodiment the operating system, is implemented such that it does not look for another component after completing (724) other tasks it is defined to perform. If there are other components to launch, (804) a RIM Certificate for verification of the next Trusted Component is requested, and a RIM Certificate that describes the expected current state and the expected state of the next Trusted Component is obtained. Here, the next Trusted Component means the Trusted Component which should be booted next. (806) The Trusted Component has its hash value calculated in the same manner as described in the RIM Certificate in Calculate hash for next Trusted Component, then (808) a check is performed to see if this calculated hash value equals the hash value stored within the next Trusted Component's RIM Certificate. If they are not, indicating that there is a problem with the component such as accidental or deliberate corruption, (810) the Trusted Component will pass control to the Fail sequencer with an error code to indicate that the hash of the next Trusted Component did not validate, to allow the Fail sequencer to process the error. This processing is described in FIG. 9 below. If the hash values are equal, (812) the Component error recorder records that the hash check for the next Trusted Component was successful. Next, (814) this RIM Certificate is extended into the MTM according to the prior art, and (816) the success or otherwise of the extend operation is checked. If the extend operation failed, (818) the Trusted Component will pass control to the Fail sequencer with an error code to indicate that the extend into the MTM of the next Trusted Component failed, to allow the Fail sequencer to process the error. This processing is described in FIG. 9 below. If instead the hash value extended correctly, (820) this indicates that the next Trusted Component can be fully trusted by the Trusted Area, so the processing will be repeated from step 708. After that, (708) the next additional component is launched, and as indicated the control flow continues with Trusted Component initializes above.

Figure 9:
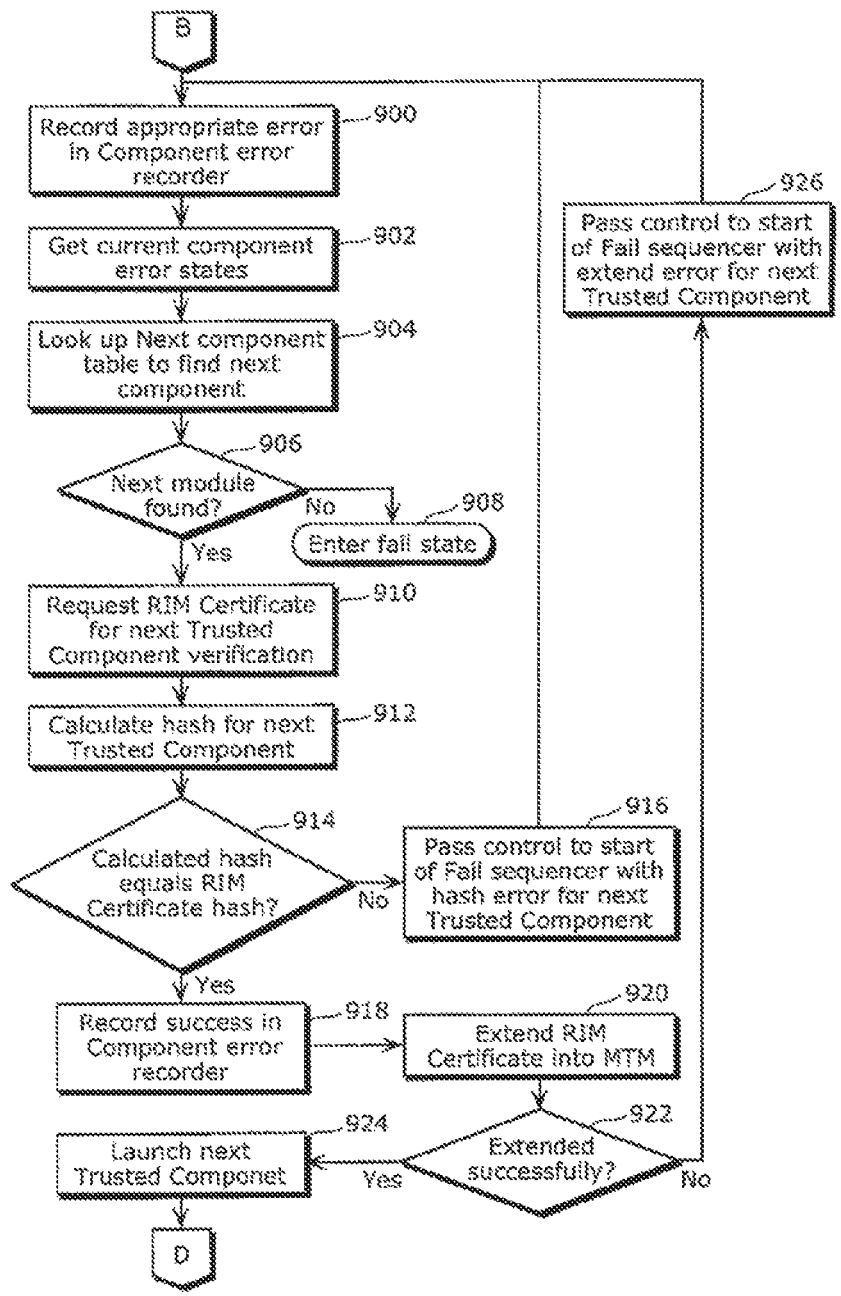
FIG. 9 illustrates a flow chart for the process of performing a secure boot with optional components according to the present invention.

FIG. 9 illustrates the Fail sequencer operation according to the present invention. (900) First, the passed-in error code is recorded in the Component error states 300. (902) Next, all the current component error states are retrieved from the Component error states 300 which are then (904) used to look up the Next component table 312 to find the next Trusted Component that should be launched. (906) A check is made to see if there is a defined next component, and if not, (908) the secure boot will enter a fail state and the device will fail to start up in a secure fashion. If there is a next Trusted Component, then (910) Request RIM Certificate for next Trusted Component verification obtains a Fail RIM Cert that describes the expected current state and the expected state of the next Trusted Component. Here, the next Trusted Component means the Trusted Component which should be booted next. (912) The next Trusted Component has its hash value calculated, (914) then the calculated hash value is compared with the hash value within the RIM Certificate. If they are not equal, indicating that there is a problem with the component such as accidental or deliberate corruption. So, (916) the Fail sequencer will pass control back to the start of Fail sequencer with an error code to indicate that the hash of the next Trusted Component did not validate, to allow the Fail sequencer to process the error and (900) control flow continues from Record appropriate error in Component error recorder. If the hash values are equal, then (918) the Component error recorder records that the hash check for the next Trusted Component was successful. Next, (920) this RIM Certificate is extended into the MTM according to the prior art, and (922) the success or otherwise of the extend operation is checked. If the extend operation failed, (926) the Fail sequencer will pass control back to the start of Fail sequencer with an error code to indicate that the extend of the next Trusted Component did not validate, to allow the Fail sequencer to process the error and (900) control flow continues from Record appropriate error in Component error recorder. If the hash value extends correctly, (924) this indicates that the next Trusted Component can be fully trusted by the Trusted Area, so the next additional component is launched, and as indicated the control flow continues with (708) Trusted Component initializes above.

As described above, the secure boot method according to one aspect of the present invention is a secure boot method for executing components in a predetermined sequence while verifying integrity, the method including: obtaining a piece of current state information, the piece of current state information indicating whether or not each of one or more components tried to be booted before a first component has been booted successfully; obtaining a first integrity measurement value corresponding to the first component and to the state indicated by the piece of current state information, by looking up a first mapping table in which logical identifiers, pieces of state information and integrity measurement values are associated with each other, the logical identifiers each identifying a corresponding one of the components, the pieces of state information each indicating whether or not each of one or more components tried to be booted before the corresponding one of the components has been booted successfully, and the integrity measurement value being a value for verifying that one or more components, which are indicated to have been booted successfully by corresponding piece of state information, have really been booted successfully; obtaining a current integrity measurement value, the current integrity measurement value being a value calculated based on one or more components which have been booted; verifying whether or not one or more components, which are indicated to have been booted successfully by the piece of current state information, have really been booted successfully, by comparing the first integrity measurement value and the current integrity measurement value; starting to boot the first component when the verifying results in success; and updating the piece of current state information to indicate that the first component has been booted successfully when the first component finishes booting successfully.

Furthermore, the secure boot method may further include: judging whether or not the first component is tampered with; suppressing the booting of the first component when the first component is judged to be tampered with, even when the verifying results in success; updating the piece of the current state information to indicate that the first component has not been booted successfully, when the booting is suppressed; determining a second component to be booted next, the determining is performed by looking up a second mapping table to obtain the identifier corresponding to whether or not the first component has been booted successfully and whether or not the piece of current state information indicates a third component has been booted successfully, the third component being a component on which the first component is dependent, and the second mapping table including logical identifiers of candidates of the second component in association with state of whether or not the first component has booted successfully and state of whether or not the third component has booted successfully; and starting to boot the second component.

Furthermore, each of the integrity measurement values may be included in an integrity measurement certificate, the integrity measurement certificates including the integrity measurement value and a verification value used in judging whether or not a component identified by the logical identifier corresponding to the integrity measurement value is tampered with, in the obtaining of the first integrity measurement value, an integrity measurement certificate may be obtained by looking up the first mapping table in which each of the pieces of state information and each of the integrity measurement certificates are associated with each other, and the first integrity measurement value may be extracted from the obtained integrity measurement certificate, and the judging of whether or not the first component is tampered with may be performed by calculating a verification value of the first component and comparing the calculated verification value with the verification value included in the obtained integrity measurement certificate.

Furthermore, the judging of whether or not the first component is tampered with may be performed after the starting to boot the first component, and in the suppressing of the booting, the booting of the first component may be aborted when the first component is judged to be tampered with.

Furthermore, the secure boot method may further include: obtaining, when the first component is judged to be tampered with, a fail value indicating the first component has not been booted successfully; updating the current integrity measurement value by using the fail value; obtaining a second integrity measurement value corresponding to the logical identifier of the second component and to the state indicated by the updated piece of current state information, by looking up the first mapping table, the updated piece of current state information indicating the first component has not been booted successfully; verifying state of (a) whether or not one or more components, which are indicated to have been booted successfully by the updated piece of current state information, have really been booted successfully, and (b) whether or not one or more components, which are indicated not to have been booted successfully by the updated piece of current state information, have not really been booted, by comparing the second integrity measurement value and the updated current integrity measurement value; and booting the second component when the verifying results in success.

Furthermore, the current integrity measurement value may not be updated when the first component is judged to be tampered with, and the method may further include: obtaining a second integrity measurement value corresponding to the logical identifier of the second component and to the state indicated by the updated piece of current state information, by looking up the first mapping table, the updated piece of current state information indicating the first component has not been booted successfully; verifying whether or not one or more components, which are indicated to have been booted successfully by the updated piece of current state information, have really been booted successfully, by comparing the second integrity measurement value and the current integrity measurement value; and booting the second component when the verifying results in success.

Furthermore, a method according to one aspect of this invention is a method for executing a software component verifiable against integrity measurements including: a) providing a mapping from logical identifiers and previous software component statuses information to actual integrity measurement certificates containing verification data; b) looking up said mapping for a given logical identifier identifying said component's verification certificate and said previous component statuses to get an integrity measurement certificate; c) calculating check value of said component to execute; d) verifying said integrity measurement match integrity measurement value within said integrity measurement certificate and that said calculated check value matches check value within said integrity measurement certificate; e) updating current integrity measurement to include an indication of said stored measure if said verification is successful; and f) executing said component if said verification is successful.

Furthermore, the method may further include: a) if said verification is unsuccessful, looking up said mapping for a given logical identifier identifying said component's verification failure certificate and said previous component statuses to get a failure integrity measurement certificate; and b) updating current integrity measurement to include an indication of unsuccessful integrity measurement stored within said failure integrity measurement certificate.

Furthermore, the method may further include: a) if said verification is unsuccessful, providing a mapping from logical identifiers and previous software component statuses information to component identifiers, b) looking up said mapping for a given logical identifier identifying said failed component and said previous component statuses to get an alternative software component to be executed.

Furthermore, a method according to one aspect of the invention is a method for a software component to verify itself against integrity measurements including: a) providing a mapping from logical identifiers and previous software component statuses information to actual integrity measurement certificates containing verification data; b) looking up said mapping for a given logical identifier identifying said component's self-validation certificate and said previous component statuses to get an integrity measurement certificate; c) verifying said integrity measurement matches integrity measurement value within said integrity measurement certificate; and d) updating current integrity measurement to include an indication of successful integrity measurement stored within said integrity measurement certificate if said verification is successful.

Furthermore, the method may further include: a) if said verification is unsuccessful, looking up said mapping for a given logical identifier identifying said component's self-validation failure certificate and said previous component statuses to get an integrity measurement certificate.

Furthermore, the method may further include: a) if said verification is unsuccessful, providing a mapping from logical identifiers and previous software component statuses information to component identifiers, b) looking up said mapping for a given logical identifier identifying said failed component and said previous component statuses to get an alternative component that is to be executed.

Furthermore, a device according to one aspect of the present invention is a device for executing software verifiable against integrity measurements including: a) a component storing unit to store one or more trusted software component which are verified before executed; b) a verifying unit to verify integrity of said trusted software: c) an executing unit to execute said component if said verification is successful; d) a fail sequencer unit to handle fail of verifying some said trusted software component and running other component which has no relation with said verification-failed trusted software component.

Furthermore, said verifying may mean to verify said integrity measurement match integrity measurement value within said integrity measurement certificate and said calculated check value matches check value within said integrity measurement certificate; and, the device may further include: a) a calculating unit to calculate check value for said component to execute; b) a looking up unit to look up said mapping for a given logical identifier identifying said component's verification certificate and said previous trusted software component statuses to get an integrity measurement certificate; c) a mapping unit to map from logical identifiers and previous trusted software component statuses information to actual integrity measurement certificates containing verification data; and d) an updating unit to update current integrity measurement to include an indication of said stored measure if said verification is successful.

Furthermore, said trusted software component may be programmed to execute some trusted function.

Furthermore, said trusted software component may be an operating system which provides trusted execution environment to protect execution software; and, the device may further include: a) a hypervisor to control one ore more operating system; and b) a fail sequencer unit to handle fail of verifying at least one of said operating system and, the device run other operating system which has no relation with said verification-failed trusted software component.

It should be noted that although the present invention is described based on aforementioned embodiment, the present invention is obviously not limited to such embodiment. The following cases are also included in the present invention.

Figure 10:
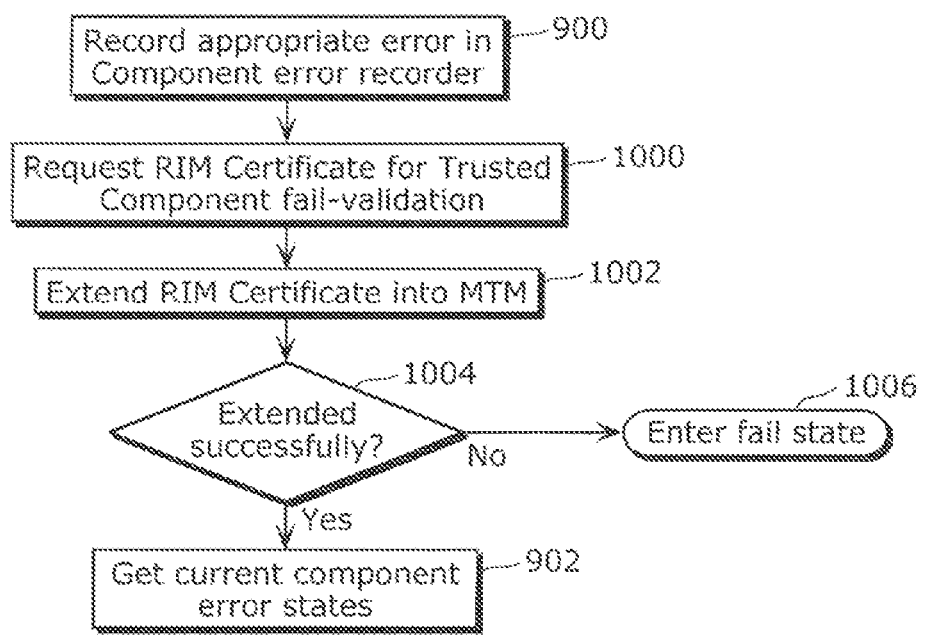
FIG. 10 illustrates a flow chart for an enhancement to the process of performing a secure boot with optional components according to the present invention.

(1) In aforementioned embodiment, if a component is not correctly booted, the system searches for next module without reflecting the failure status to MTM. However, the system may reflect the failure status to the MTM. FIG. 10 illustrates this enhancement to the present invention. To explicitly describe the error produced by the Fail sequencer after (900) Record appropriate error in Component error recorder, (1000) the CPU requests a RIM Certificate for validating the failure of a Trusted Component. This Fail RIM Cert 308 contains a value to extend that explicitly describes a current failure condition. (1002) This RIM Certificate then has the value that describes the failure condition extended into a PCR described within the RIM Certificate. (1004) The success or failure of this extend operation is checked, and if it failed, (1006) the secure boot will enter a fail state and the device will fail to start up in a secure fashion. If it succeeded, then (902) the control flow returns to Get current component error states to retrieving the current component error status information to continue trying to start up an alternative component, as described above.

(2) In the case of a virtualization environment, in one embodiment a hypervisor is the final trusted component that executes. In another embodiment other trusted components, such as operating systems, execute after the hypervisor trusted component executes.

(3) In aforementioned embodiment, the verification of each component is performed before each of them is launched. However, present invention can be applied to a system in which the verifications are performed after the each of the components is launched. In that case, the system stops each component if the verification for the component is failed.

(4) In aforementioned embodiment, the verification is performed in a similar manner to the TCG specifications. However, present invention can be applied to another verification system, as long as, the verification system can verify the components of the system using a verification method in which the component are verified like a chain (i.e. one component verifies another component which launch after the one component). For example, extending the hash value into MTM may be omitted, because this operation is specific for TCG specification.

(5) In aforementioned embodiment, the verification is performed by using hash values in a certificate (RIM Cert). However, another verification method which does not use hash values may be applied to present invention.

Conventional check sum or another data extracted from the component (for example, a first predetermined bits extracted from the component) may be used to perform verification. Furthermore, the certificate may be replaced to a data group which includes the integrity measurement values.

And, the verification method is not limited to check whether or not a value extracted from the component and an expected value matches. For example, checking the size of the component, and if the size is larger or smaller than a predetermined amount the component may be judged to be verified. These verification methods are not so strict as comparing hash value with its expected value, however they can be performed fast.

(6) Each of aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer.

(7) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as an individual chip, or as a single chip to include a part or all thereof.

Furthermore, here, System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears thorough progress in semiconductor technology or other derived technology, that technology can naturally be used to carry out integration of the constituent elements. Biotechnology is anticipated to apply.

(8) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also be implemented to be tamper-resistant.

(9) The present invention, may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(10) Those skilled in the art will readily appreciate that many modifications are possible in the exemplary embodiment without materially departing from the novel teachings and advantages of this invention. Accordingly, arbitrary combination of the aforementioned modifications and embodiment is included within the scope of this invention.

Industrial Applicability

The present invention can be used, for example, in a mobile phone, and so on.

The invention claimed is:

1. A secure boot method for executing components in a predetermined sequence while verifying integrity, said method comprising:
   judging whether or not a first component is corrupted;
   suppressing booting of the first component when the first component is judged to have been corrupted;
   updating a piece of current state information to indicate that the first component has not been booted successfully, when the booting is suppressed, the piece of current state information indicating whether or not each of one or more components was successfully booted before the booting of the first component;
   looking up a first mapping table including logical identifiers of candidates of a second component to be booted next in association with a state of whether or not the first component has been booted successfully;
   determining the second component to be booted next, by obtaining, from the first mapping table, a logical identifier associated with the state of the first component indicated by the updated piece of current state information; and
   starting to boot the second component.

2. The secure boot method according to claim 1, wherein the judging of whether or not the first component is corrupted includes calculating a verification value of the first component and comparing the calculated verification value with an integrity measurement value included in an obtained integrity measurement certificate, and
   wherein the obtained integrity measurement certificate is obtained by looking up a second mapping table in which logical identifiers, pieces of expected state information, and integrity measurement certificates are associated with each other, (i) the logical identifiers each identifying a corresponding one of the components, (ii) the pieces of expected state information each indicating expected one or more components that have been successively booted before booting of the component identified by the logical identifier associated with the piece of expected state information, and (iii) the integrity measurement certificates each including an integrity measurement value for judging whether or not the component identified by the logical identifier associated with the integrity measurement certificate is corrupted.

3. The secure boot method according to claim 1, wherein the judging of whether or not the first component is corrupted is performed after the starting to boot the first component, and
   in the suppressing of the booting, the booting of the first component is aborted when the first component is judged to have been corrupted.

4. A secure boot device for executing components in a predetermined sequence while verifying integrity, said secure boot device comprising:
   a judging unit configured to judge whether or not a first component is corrupted;
   a suppressing unit configured to suppress booting of the first component when the first component is judged to have been corrupted;
   an updating unit configured to update a piece of current state information to indicate that the first component has not been booted successfully, when the booting is suppressed, the piece of current state information indicating whether or not each of one or more components was successively booted before the booting of the first component;
   a look up unit configured to look up a first mapping table including logical identifiers of candidates of a second component to be booted next in association with a state of whether or not the first component has been booted successfully;
   a determining unit configured to determine the second component to be booted next, by obtaining, from the first mapping table, a logical identifier associated with the state of the first component indicated by the updated piece of current state information; and
   a booting unit configured to start to boot the second component.

5. The secure boot device according to claim 4, wherein
   wherein the judging unit is configured to judge whether or not the first component is corrupted by calculating a verification value of the first component and comparing the calculated verification value with an integrity measurement value included in an obtained integrity measurement certificate, and
   wherein the secure boot device further comprises an obtaining unit configured to obtain the obtained integrity measurement certificate by looking up a second mapping table in which logical identifiers, pieces of expected state information, and integrity measurement certificates are associated with each other, (i) the logical identifiers each identifying a corresponding one of the components, (ii) the pieces of expected state information each indicating expected one or more components that have been successively booted before booting of the component identified by the logical identifier associated with the piece of expected state information, and (iii) the integrity measurement certificates each including an integrity measurement value for judging whether or not the component identified by the logical identifier associated with the integrity measurement certificate is corrupted.

6. The secure boot device according to claim 4, wherein the judging unit is configured to judge whether or not the first component is corrupted, after the booting of the first component is started, and the suppressing unit is configured to abort the booting of the first component when the first component is judged to have been corrupted.

7. A computer program recorded on a non-transitory computer-readable medium, which causes a computer to execute a secure boot method for executing components in a predetermined sequence while verifying integrity, said program causing the computer to execute:

judging whether or not a first component is corrupted;

suppressing booting of the first component when the first component is judged to have been corrupted;

updating a piece of current state information to indicate that the first component has not been booted successfully, when the booting is suppressed, the piece of current state information indicating whether or not each of one or more components was successively booted before the booting of the first component;

looking up a first mapping table including logical identifiers of candidates of a second component to be booted next in association with a state of whether or not the first component has been booted successfully;

determining the second component to be booted next, by obtaining, from the first mapping table, a logical identifier associated with the state of the first component indicated by the updated piece of current state information; and starting to boot the second component.

8. An integrated circuit which executes components in a predetermined sequence while verifying integrity, said integrated circuit comprising:

a judging unit configured to judge whether or not a first component is corrupted;

a suppressing unit configured to suppress booting of the first component when the first component is judged to have been corrupted;

an updating unit configured to update a piece of current state information to indicate that the first component has not been booted successfully, when the booting is suppressed, the piece of current state information indicating whether or not each of one or more components was successively booted before the booting of the first component;

a look up unit configured to look up a first mapping table including logical identifiers of candidates of a second component to be booted next in association with a state of whether or not the first component has been booted successfully;

a determining unit configured to determine the second component to be booted next, by obtaining, from the first mapping table, a logical identifier associated with the state of the first component indicated by the updated piece of current state information; and a booting unit configured to start to boot the second component.

\* \* \* \* \*